United States Patent [19]

Endoh

[11] Patent Number: 5,031,170

[45] Date of Patent: Jul. 9, 1991

[54] OPTICAL PICK-UP DEVICE

[75] Inventor: Atsushi Endoh, Tachikawa, Japan

[73] Assignee: Teac Corporation, Japan

[21] Appl. No.: 358,702

[22] Filed: May 30, 1989

[30] Foreign Application Priority Data

Jun. 7, 1988 [JP] Japan .............................. 63-75345[U]

[51] Int. Cl.⁵ .............................................. G11B 7/00
[52] U.S. Cl. ................................. 369/247; 369/44.11; 369/44.15
[58] Field of Search .............. 369/244, 247, 43, 44.11, 369/44.13, 44.14, 44.15, 44.21–44.22, 44.32

[56] References Cited

U.S. PATENT DOCUMENTS

| | | | |
|---|---|---|---|
| 4,516,231 | 5/1985 | Michaelis ........................ | 369/247 X |
| 4,553,231 | 11/1985 | d'Alayer de Costemore d'Arc ................ | 369/247 X |
| 4,658,390 | 4/1987 | Fujii et al. ....................... | 369/44.16 |
| 4,660,190 | 4/1987 | Fujii et al. ....................... | 369/44.16 |
| 4,695,996 | 9/1987 | Sugihara et al. ................ | 369/247 X |
| 4,922,478 | 5/1990 | Verhagen ........................ | 369/247 |

Primary Examiner—William M. Shoop, Jr.
Assistant Examiner—David Martin
Attorney, Agent, or Firm—Andrus, Sceales, Starke & Sawall

[57] ABSTRACT

An optical pick-up device comprises a body, an objective lens provided on the body so as to oppose a recording medium, a laser source for producing a laser beam, a mirror for reflecting the laser beam towards the objective lens, a first table member mounted on the body of the optical pick-up device in which the first table member carries a table part such that the table part can be tilted relative to the body, an adjustment mechanism for adjusting tile of the table part of the first table member relative to the body, a second table member to which the mirror is mounted, and a connecting part of a material having elasticity and capable of absorbing vibration, interposed between the second table member and the table part of the first table member for supporting the second table member relative to the table part of the first table member.

2 Claims, 4 Drawing Sheets

OPTICAL PICK-UP DEVICE

BACKGROUND OF THE INVENTION

The present invention generally relates to optical pick-up devices assembled in an optical disk apparatus, and more particularly to a structure for supporting a mirror such that a laser beam is reflected by the mirror towards an objective lens.

On a part of a mirror of an optical pick-up device, there is provided a mechanism for a fine adjustment of inclination angle such that the laser beam is directed to the objective lens properly. When a distortion is developed on a reflection surface of the mirror in such a device, the beam spot on a disk is distorted and the playback of information is deteriorated. Thus, there should be no distortion occurring on the reflection surface of the mirror. For this reason, the said mechanism of fine adjustment of the inclination angle has to be able to perform fine adjustment of the inclination angle without causing distortion on the reflection surface.

It should be noted that the mirror is located close to an actuator used for focusing and tends to be subjected to vibration when the actuator is operated. If the said adjustment mechanism is attempted to be structured to meet the above requirement, it is necessary to design the part for supporting the mirror to have a smaller diameter. The part in this case, however, receives vibration from the actuator and becomes more susceptible to cause resonance. When a resonance is developed, the focus or tracking servo control system causes oscillation, leading to loss of focusing or tracking control. Therefore, the said adjustment mechanism needs to be structured so as to suppress the vibration of the mirror. In other words, the structure of the part for supporting the mirror is required: (a) to be able to perform fine adjustments of the inclination angle without causing a distortion on the reflection face; and (b) to be able to suppress the vibration of the mirror.

In a conventional mechanism as will be described in detail later, a table structure comprising a first table part and a second table part coupled each other at their center by a boss of a small diameter is mounted to the main body of an optical pick-up device, and the fixed mirror is mounted on the first table part located at the upper side. When the inclination of the fixed mirror is adjusted in such a mechanism, the second table which is located at the lower side is pushed by means of adjustment screw and is inclined. When the second table part is inclined, the first table part is inclined responsive thereto. Thus, the inclination of the mirror is adjusted. It should be noted that the first table part is inclined while maintaining its flatness, and the mirror is adjusted of its inclination angle without causing distortion on the reflection surface.

In such a pick-up device in which the first table part is coupled to the second table part only by a boss of small diameter, however, there is a problem in that it easily picks up vibration and the mirror vibrates together with the first table part. Vibration of the fixed mirror gives an adverse effect, especially to the tracking servo operation as it causes abnomal reproduction of the information.

SUMMARY OF THE INVENTION

Accordingly, it is a comprehensive object of the present invention is to provide a new and useful optical pick-up device desolved of the above problem.

The other object of the present invention is to provide an optical pick-up device in which the table part to which the mirror is mounted is made independent from the rest of the table part which is fixed to the main body of the optical pick-up device, and the both table parts are coupled each other by a vibration absorbing structure having elasticity interposed between the two tables.

According to the present invention, the existence of the vibration absorbing structure having elasticity prevents the occurrence of distortion on the reflection surface of the fixed mirror, and the vibration of the fixed mirror is suppressed as well.

Other objects and features of the present invention will be obvious from the descriptions hereunder made referring to the drawings.

DETAILED DESCRIPTION

First, a description is given for the conventional art.

Figure 1:
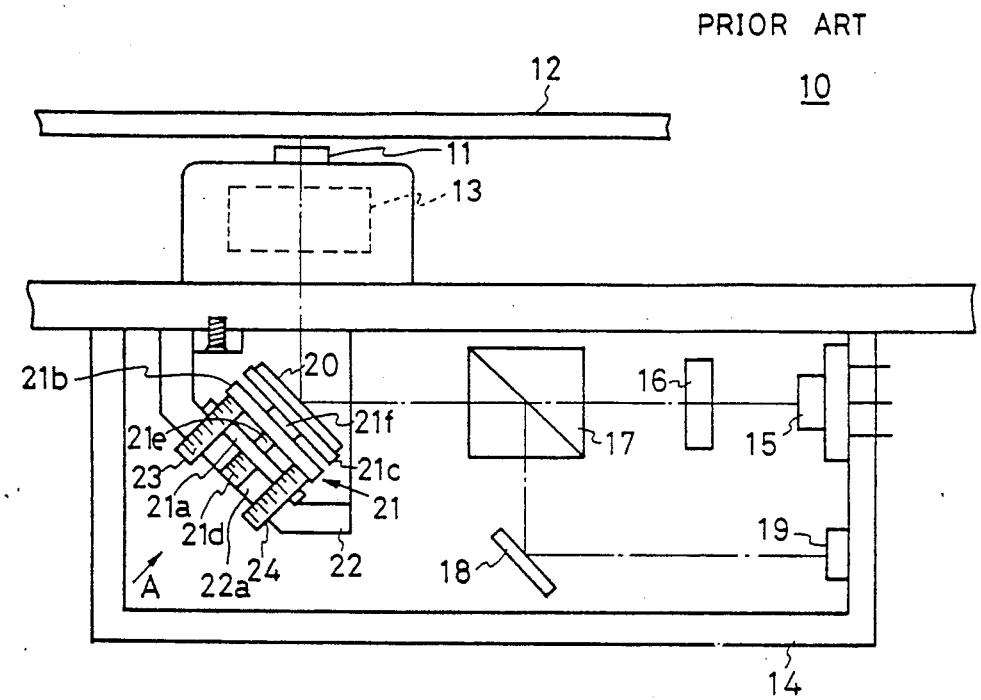
FIG. 1 is a view showing a conventional optical pick-up device.

FIG.1 shows the conventional optical pick-up device 10. Referring to the drawing, an objective lens 11 driven by an actuator 13 faces an optical laser disk 12. In a casing 14, there is provided a laser diode 15, a diffraction grating 16, a deflection beam splitter 17, a reflection mirror 18, a light receiving element 19 and a fixed reflection mirror of a disk shape 20, and the device 10 optically reproduces information from the optical disk 12 while performing tracking and focusing control.

Figure 2:
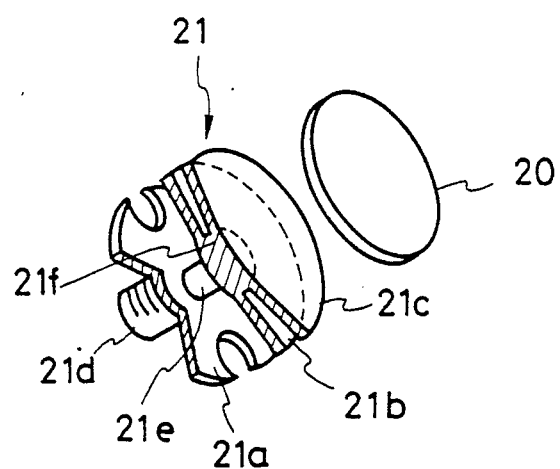
FIG. 2 is a perspective view of the table structure shown in FIG. 1 in a state in which a part thereof being cut out.

A part 21 is a table structure which is consisted, as also shown in FIG. 2, of a base part 21a, a first table part 21b, a second table part 21c located above the first table part 21b, a screw part 21d protruding downward from the base part 21a, a pillar part 21e of a small diameter between the base part 21a and the first table part 21b, and a central boss part of a small diameter 21f for supporting the second table part 21c 5 against the first table part 21b. In addition, a mirror bracket 22 is mounted in the casing 14. The above table structure 21 is installed on a slanted part 22a and fixed thereto with the screw part 21d by screwing it into the female screw of the mirror bracket 22.

Figure 3:
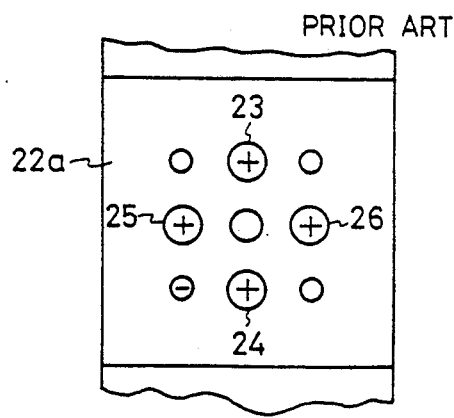
FIG. 3 is a drawing as viewed from the direction of the arrow mark A in FIG. 1.

As shown also in FIG. 3, screws 23-26 for adjusting the inclination angles of the reflection mirror are provided so as to pierce through the said slanted part 22a with a mutual angle of 90 degrees such that their tips contacts the lower side of the circumference of the first table part 21b. The fixed reflection mirror 20 is mounted on the second table part 21c. The pillar part 21e is flexed by turning the adjusting screws 23 through 26 appropriately, and responsive thereto, the table part 21b is inclined. When the first table part 21b is inclined, the second table part 21c is inclined correspondingly, and the inclination of the fixed reflection mirror 20 is adjusted.

When the first table part 21b is pushed by the screws, its face is distorted. However, since the coupling part of the second table part 21c and the first table part 21b is limited to the central boss part 21f, the distortion on the face of the second table part 21c is not easily formed. Accordingly, the fixed reflection mirror 20 is adjusted for the inclination angle without causing distortion on its reflection surface.

At the time of playing back the information from the disk, a disturbing vibration is generated in the casing 14, for example by the actuator for tracking and focusing. Under such a conditions it is necessary that the gain is less than zero for a range of frequency ($>f_0$) of the disturbing vibration caused at the time of reproduction.

However, in the device 10, the diameter of the boss part 21f is made small in order that the second table part 21c is not distorted by the angle adjustment. Therefore, the mechanical strength of the second table part 21c against the first table part 21b is weak, making the second table part 21c susceptible to generate vibration relative to the first table part 21b.

Figure 4:
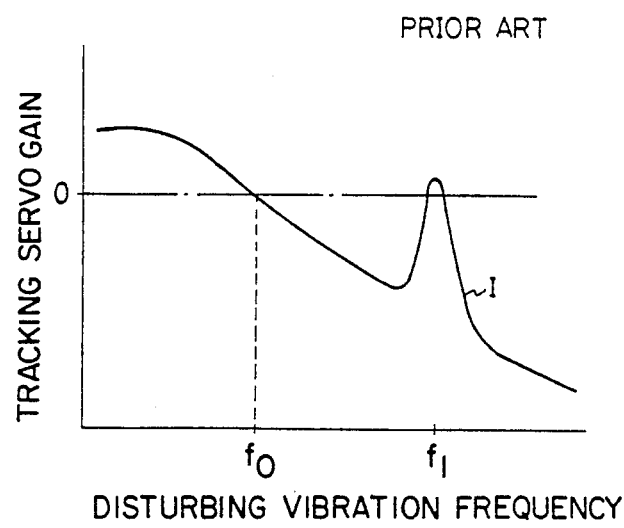
FIG. 4 is a graph showing the relation of the tracking servo gain of the device in FIG. 1 to the disturbing vibration frequency.

FIG. 4 shows a result of tracking servo gain measurment conducted for the said device 10 while continuously applying a disturbing vibration by a curve "I". As can be seen, the gain exceeds zero at the vibration frequency in the vicinity of a frequency "$f_1$". In this state, the tracking servo system develops an oscillation, causing abnormal reproduction. The reason of this may be that the second table part 21c (fixed reflection mirror 20) starts severe vibration at the vibration frequency close to "$f_1$".

Next, a description is given for the optical pick-up device according to the present invention.

Figure 5:
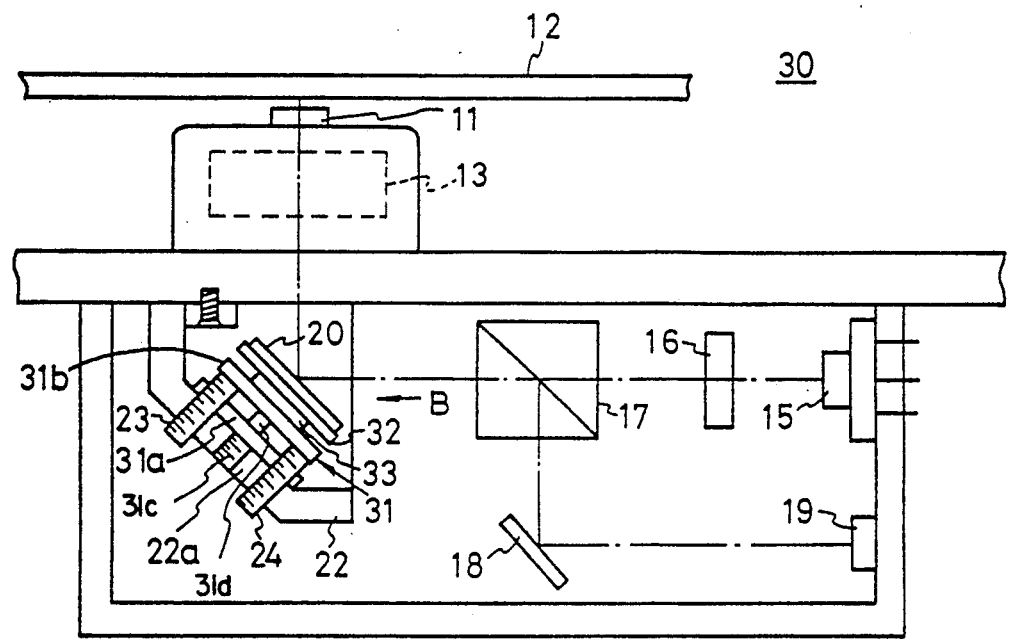
FIG. 5 is a view illustrating an embodiment of the optical pick-up device according to the present invention.
Figure 6:
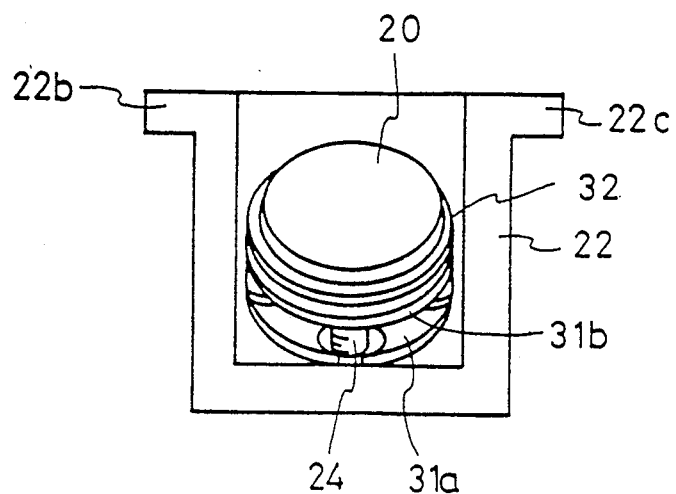
FIG. 6 is a drawing as viewed from the direction of the arrow mark B in FIG. 5.
Figure 7:
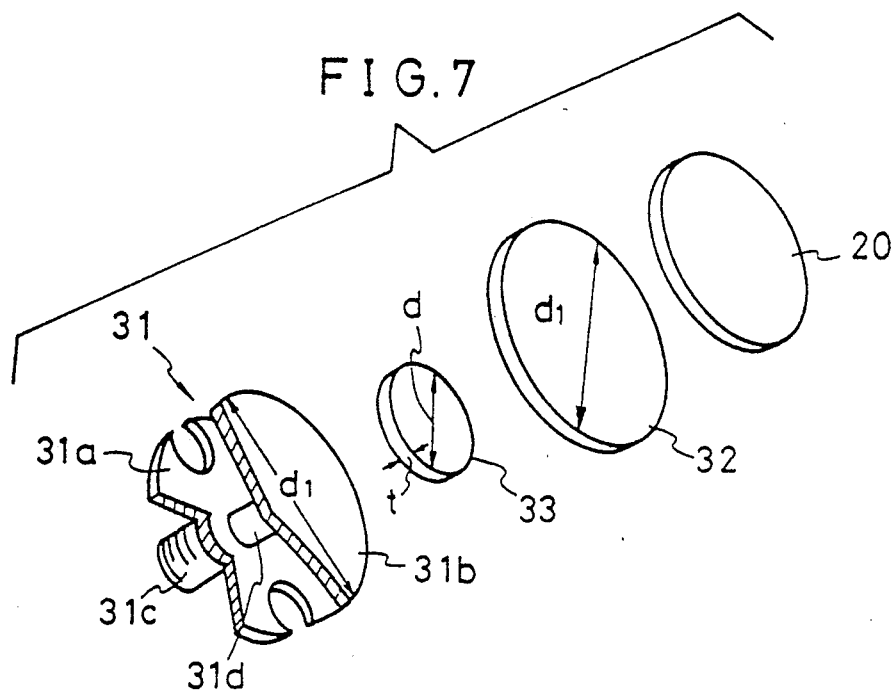
FIG. 7 is an exploded view of the part for mounting the mirror in a state in which a part thereof being cut out.

FIG. 5 shows the optical pick-up device 30 according to one embodiment of the present invention, and FIG. 6 and 7 show respectively the structure of the part for mounting the fixed reflection mirror. In FIGS. 5 through 7, those parts identical to the components shown in FIGS. 1 and 2 are attached with the same reference numerals and the description thereof will be omitted.

The mirror bracket 22 has an approximately equiangular form as shown in FIGS. 5 and 6, in which flange parts 22b and 22c at both sides are screwed to the casing 14, so as to form a part of the main body of the optical pick-up device.

The drawings show a part 31 which is the first table structure consisted of a base part 31a, a table part 31b, a screw part 31c protruding from the base part 31a, and a pillar part 31d for supporting the table part 31b against the base part 31a. The part 31 is installed on the slanted part 22a of the mirror bracket 22 by screwing the screw part 31c into the female screw of the bracket 22.

Further, there is a part 32 which is the second table structure of a disk shape, provided independently from the said first table structure 31. The table part 31b and the second table structure 32 has a disk shape of same size having a diameter "$d_1$". The fixed reflection mirror 20 is fixed on the second table structure 32.

In FIG. 5, there is shown a part 33 which is a disk shaped plate of silicon-butyl rubber having a thickness "t" of 1 mm and a diameter "d" of 8 mm. The silicon-butyl rubber comprises a mixture of silicon and butyl and has elasiticity. The diameter "d" is made smaller than the diameter "$d_1$" of the second table structure 32 or the table part 31b. The silicon-buthyl rubber plate material 33 is chosen because of its temperature stability and large capability of absorbing vibration. The diameter "d" of the rubber plate material 33, chosen to 8 mm which is about half the diameter "$d_1$" of the second table structure 32 or table part 31b ($=14$ mm), is determined on the following ground:

When the diameter "d" of the rubber plate material 33 is increased, there is an increase in the vibration absorbing capability. In doing so, however, bending of the table part 31b at the time of adjustment tends to affect the second table structure 32 as will be described. If, on the other hand, the diameter "d" is made smaller, the effect of bending of the table part 31b on the second table structure 32 is certainly reduced but the vibration absorption capability is decreased at the same time. Moreover, the mechanical strength of the second table structure 32 to support the table part 31b decreases. Therefore, in order to assure that the bending of the table part 31 is does not affect the table structure 32 substantially while maintaining sufficient vibration absorbing capability and further to support second table structure 32 sufficiently, the said diameter "d" is determined to be 8 mm which is about half the diameter "$d_1$" of the table structure 32 on the table part 31b.

The second table structure 32 is installed on the table part 31b through the rubber plate material 33 which is interposed between the second table structure 32 and the table part 31b of the first table structure 31. The rubber plate material 33 is arranged centrally to the plane of the second table structure 32 or the table part 31b and is bonded to the second table structure 32 and the table part 31. The rubber plate material 33 functions to absorb the vibration as will be described later and transmits the inclination change of the table part 31b to the second table structure 32 without distorting the second table structure 32.

The adjustment of inclination angle of the fixed reflection mirror is carried out by rotating the screws 23 through 26 as already described. As a result of operation, the pillar part 31d is flexed to incline the table part 31b. The second table structure 32 is inclined corresponding to the table part 31b, and the inclination angle of the fixed reflection mirror 20 is variably adjusted. At this time, although the table part 31b is bent due to the push by the screws 23 through 26, the effect of this bending is absorbed by the rubber plate material 33, and is not conveyed to the second table structure 32. Thus, the fixed reflection mirror 20 is kept free from bending, and maintains the initial flatness. Thus, adjustment of angle does not cause distortion in the beam spot of the optical disk 12, and the playback is performed without problem.

It should be noted that a same disturbing vibration occurs in the bracket 22 at the time of playback, and the fixed reflection mirror 20 vibrates responsive thereto if the vibration is transmitted. In the present invention, the first table structure 31 vibrates together with the bracket 22. If the vibration is transmitted to the fixed reflection mirror 20, the mirror 20 is subjected to vibration. However, the vibration of the first table structure 31 propagating to the fixed reflection mirror 20 through the rubber plate material 33 is absorbed in the rubber plate material, and therefore, the vibration to the fixed reflection mirror 20 is suppressed.

Figure 8:
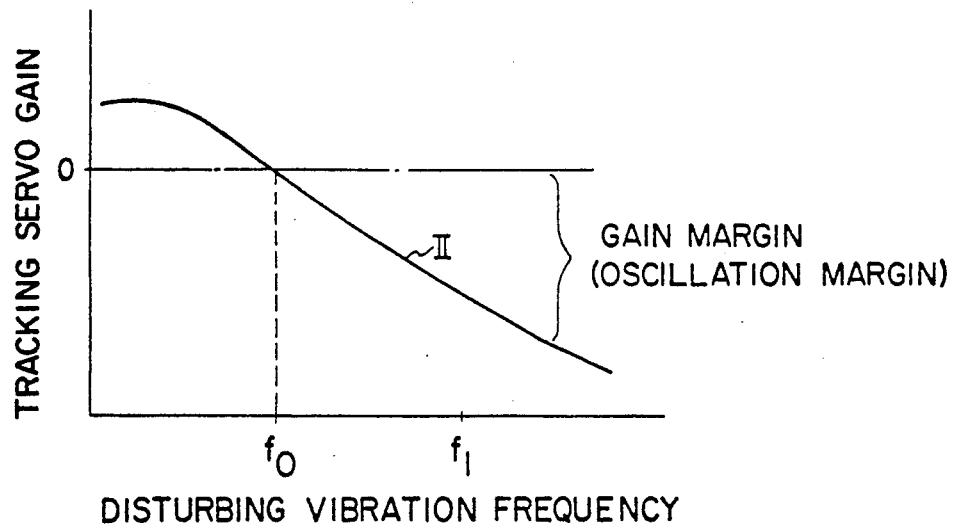
FIG. 8 is a graph showing the relation of the tracking servo gain of the device in FIG. 5 to the disturbing vibration frequency.

For the device 30, an experiment was carried out in which the tracking servo gain was measured while applying a disturbing vibration to the bracket 22. The result is shown in FIG. 8 by a curve II. As can be seen from the figure, the gain became less than zero (negative) when the vibration frequency exceeds "$f_0$" and decreases slowly as the vibration frequency increases. Thus, the gain remains below zero even at the vibration frequency "$f_1$".

As a result, no erroneous operations such as oscillation occurs in tracking servo system during disk playback. In addition, the gain margin for the tracking servo system becomes wider, hence sufficient oscillation margin is secured. The device 30 thus insensitive against the eccentricity, vibration and shock of the optical disk.

Moreover, the relationship between the focus servo gain and the disturbing vibration frequency is approximately the same as represented by the line II in FIG. 8. Thus, a wide gain margin again is secured also for the focusing servo system, and device 30 is insensitive also against the deflection of the optical disk.

Further, it should be noted that a material possessing a same mechanical property as rubber such as vibration-proof rubber, may be used in place of the said rubber plate material 33.

The present invention is not limited to an optical pick-up device in an optical disk device, but applicable also to an optical pick-up device in magneto-optical disk device.

Further, the present invention is not limited to these embodiments but various variations and modifications may be made without departing from the scope of the present invention.

What is claimed is:

1. An optical pick-up device comprising:
   a body;
   an objective lens provided on the body so as to oppose a recording medium;
   a laser source for producing a laser beam;
   a mirror for reflecting said laser beam towards said objective lens;
   a first table member mounted on the body of the optical pick-up device, said first table member carrying a table part such that the table part can be tilted relative to the body;
   an adjustment mechanism for adjusting tilt of said table part of said first table member relative to the body;
   a second table member to which said mirror is mounted; and
   a connecting part of a material having elasticity and capable of absorbing vibration, interposed between said second table member and said table part of said first table member for supporting the second table member relative to the table part of the first table member,
   said connecting part comprising a plate material of siliconbutyl rubber that has a disk shape with a diameter of about half that of said second table member and which is arranged centrally to said second table member and the table part.

2. An optical pick-up device as claimed in the claim 1 in which the connecting part comprises a plate material of disk shaped silicon-butyl rubber having a thickness of 1 mm and a diameter of 8 mm.

* * * * *